(12) United States Patent
Halstead et al.

(10) Patent No.: US 6,697,367 B1
(45) Date of Patent: Feb. 24, 2004

(54) MULTIHOP SYSTEM CALLS

(75) Inventors: Mark Halstead, Waltham, MA (US); Dan Arnon, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 736 days.

(21) Appl. No.: 09/591,827

(22) Filed: Jun. 12, 2000

(65) Prior Publication Data

(65)

(51) Int. Cl.⁷ .................................................. H04J 3/14
(52) U.S. Cl. ...................................... 370/392; 711/202
(58) Field of Search .................. 370/392, 393, 370/408, 474, 400; 711/202, 203, 218, 220

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,044,076 A | * 3/2000 | Yamamoto | 370/392 |
| 6,278,709 B1 | * 8/2001 | Walker et al. | 370/392 |
| 6,473,426 B1 | * 10/2002 | Killian | 370/393 |

FOREIGN PATENT DOCUMENTS

| | | |
|---|---|---|
| EP | 0397370 A2 | 5/1990 |
| EP | 0757318 A2 | 6/1996 |
| EP | 0936547 A2 | 2/1999 |

* cited by examiner

*Primary Examiner*—Min Jung
(74) *Attorney, Agent, or Firm*—Choate, Hall & Stewart (57) ABSTRACT

A computer system may include one or more hosts and a plurality of data storage devices for providing multihop system calls. The data storage devices are interconnected and also connected to the one or more hosts. The connections may be direct or indirect. Each data storage device classifies a data operation as a system call, a remote system call, or a multihop system call. If an operation is classified as a multihop system call by a first data storage device, a portion of the data associated with the multihop system call is removed and a second portion of the data is forwarded to a second data storage device as specified by a connection identifier included in the first portion. A recursive process of removing a first portion and forwarding a second portion of data associated with the multihop system call is performed by each data storage device forwarded a second portion of data until a data storage device receives a second portion that is interpreted as a system call or a remote system call.

32 Claims, 5 Drawing Sheets

MULTIHOP SYSTEM CALLS

BACKGROUND OF THE INVENTION

1. Technical Field

This application relates generally to computer systems, and more particularly to performing remote system calls in a computer system.

2. Description of Related Art

Computer systems may include different resources that may be used by one or more processors. Resources and processors in a computer system may be interconnected by one or more communication connections. These resources may include, for example, data storage devices such as the Symmetrix family of data storage systems manufactured by EMC Corporation. These data storage systems may be coupled to one or more processors and provide storage services to each processor. An example data storage system may include one or more data storage devices, such as those of the Symmetrix family, that are connected together and may be used to provide common data storage for one or more processors in a computer system.

A processor may perform a variety of data processing tasks and operations using the data storage system. For example, a processor may perform basic system I/O operations, such as data read and write operations and also administrative tasks, such as data backup and mirroring operations. In performing any one of the foregoing operations, the processor may use one or more system calls in which the processor making the system call instructs a data storage device to perform a particular operation.

In some data storage device arrangements, a first data storage device may be connected to a second data storage device and a processor may only be able to send commands to the second data storage device indirectly using the first data storage device. In other words, the processor only has a direct connection to the first data storage device, and an indirect connection to the second data storage device. If the processor wishes to instruct the second data storage device to perform a data operation, the processor may use a remote system call using the first data storage device. The processor may issue a remote procedure call to the first data storage device which instructs the second data storage device to perform a data operation, for example.

A problem may exist in a data storage device arrangement that includes another level of indirect data storage devices. For example, in addition to the previously described data storage device arrangement of a first and a second data storage devices, a third data storage device may be connected to the second data storage device. In some applications, a processor may need to instruct the third data storage device to perform data operations. If the processor has a direct connection only to the first data storage device, remote system calls may be used to instruct the second data storage device to perform data operations, and system calls may be used to instruct the first data storage device to perform data operations. However, in the foregoing arrangement for the processor to instruct the third data storage device to perform a data operation may require such instructions pass through an indirect connection of the first and second data storage devices. There is no way for the processor to so instruct the third data storage device using system calls or remote procedure calls due to the additional storage device layering in the data storage device arrangement. Generally, similar problems may exist in data storage device arrangements that also include more than the foregoing three levels of indirect data storage device access from a processor.

Thus, it may be advantageous to provide a technique for the processor to perform data operations in data storage arrangements that include three or more levels of indirect data storage device access.

SUMMARY OF THE INVENTION

In accordance with one aspect of the invention is a method executed on a first data storage device for processing a data operation request. It is determined whether a data operation request is a multihop system call. In response to determining that the data operation is a multihop system call, a first portion of data is removed. The first portion of data is associated with the data operation request. In response to determining that the data operation is a multihop system call, a second portion of the data is forwarded to a second data storage device wherein the second data storage device interprets the second portion and further determines if the second portion is a data operation request for a multihop system call.

In accordance with another aspect of the invention is a computer system that includes a host initiating a data operation request and at least three data storage devices. Each of the data storage devices includes machine executable code for receiving and interpreting the data operation request, determining if the data operation request is a multihop system call, removing a first portion of data associated with the data operation request if the data operation request is a multihop system call, and forwarding, in response to determining that the data operation is a multihop system call, a second portion of the data associated with the data operation request to another data storage device.

In accordance with yet another aspect of the invention is a computer system that includes at least one host system and a plurality of data storage devices interconnected and also connected to the at least one host system. Each of the plurality of data storage devices includes machine executable code for classifying a data operation as one of: a system call, a remote system call, and a multihop system call, if a data operation is classified as a multihop system call by a first of the plurality of data storage devices, removing a portion of the data associated with the multihop system call, and forwarding a second portion of the data to a second of said data storage devices as specified by a connection identifier included in the first portion, where the machine executable code for removing a first portion and forwarding a second portion included in each of the data storage devices forms a recursive process until one of the plurality of data storage device receives a second portion that is interpreted as either a system call or a remote system call.

In accordance with another aspect of the present invention, a data storage device, includes means for determining whether a data operation request is a multihop system call, means for removing a first portion of data associated with the data operation request in response to determining that the data operation is a multihop system call, and means for forwarding a second portion of the data associated with the data operation request to an other data storage device in response to determining that the data operation is a multihop system call, where the other data storage device interprets the second portion and further determines if the second portion is a data operation request for a multihop system call. The data storage device may also include means for determining whether the data operation is one of a system call and a remote system call. A system call may direct the data storage device to respond to the data operation request. The first portion may include a connection identifier identifying a communication connection between the first and the second data storage devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF VARIOUS EMBODIMENTS

Described in U.S. patent application Ser. No. 09/064,588, filed on Apr. 22, 1998 (abandoned), entitled "UNIFIED PROGRAMMING INTERFACE", herein incorporated by reference, is a technique of providing a unified interface to a data storage system allowing different host processors to access the data storage system without requiring the host processor to have knowledge as to the memory configuration, such as where internal control data structures are physically located.

Figure 1:
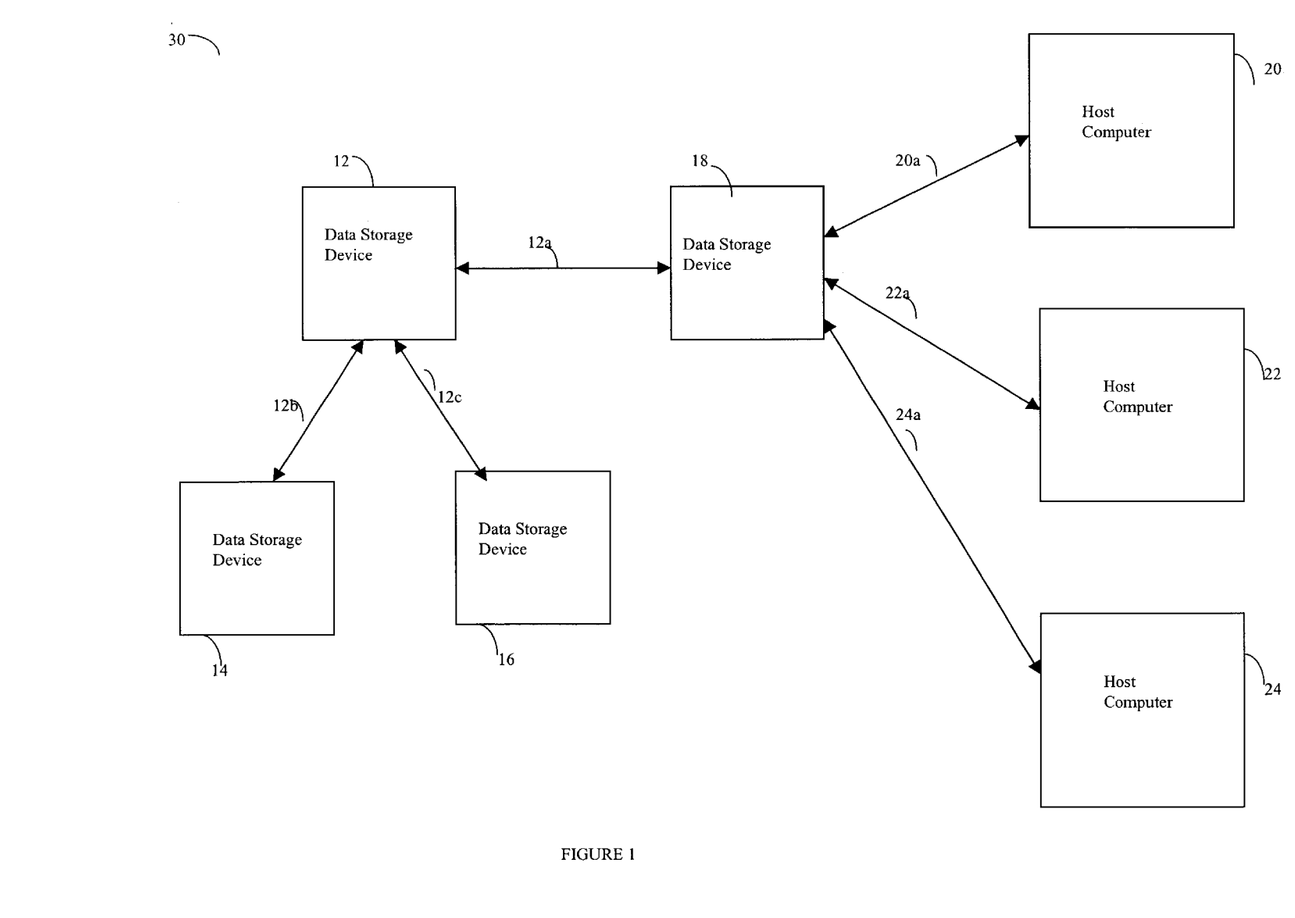
FIG. 1 is an example of an embodiment of a computer system according to the present invention.

Referring now to FIG. 1, shown is an example of an embodiment of a computer system that employs the multihop technique described herein. Included in the computer system 30 are N host computers, 20, 22, and 24 which may be, for example, host computers included in the computer system 30. The host computers 20, 22, and 24 may all be located at the same site or may be located in different areas. Also included in the computer system 30 are multiple data storage devices 12, 14, 16, and 18. Each of the data storage devices 12, 14, 16, and 18 may be any one of a variety of data storage devices, such as products provided by EMC Corporation of Hopkinton, Mass. Each of the N host computers 20, 22, and 24 may be, for example, any one of a variety of commercially available single or multi-processor computers including, for example, a personal computer or mainframe computer, such as an IBM mainframe or SUN Sparcstation. Communication is provided using any one of a variety of communication protocols, such as SCSI, ESCON, or Fiber Channel, through connections 12a, 12b, 12c, 20a, 22a, and 24a. Note some or all of connections 12a, 12b, 12c, 20a, 22a, 24a, may pass through other communication devices such as a Connectrix or any other switching equipment that may exist on the way, including a phone line, a repeater, a multiplexer or even a satellite. However, the other communication devices just act as blind transport media for purposes of the discussion herein.

Different types of data operations may be performed in accordance with different types of administrative tasks. In the embodiment of FIG. 1, any one of the host computers 20, 22 or 24 may issue a system call to the data storage device 18 to perform a data operation on the data storage device 18. Additionally, an application, for example, executing on a host computer 20 performing a backup, mirroring, or other administrative operation, may need to have one or more of the data storage devices 12, 14 and/or 16 perform a data operation. The plurality of interconnected storage devices 12, 14, 16, and 18 may be accessed by any one of the host computers 20, 22, and 24 indirectly through the data storage device 18. For example, the host computer 20 may issue a system call to the data storage device 18 to perform a read operation, a write operation or other type of data operation. A system call may be described as a call directed to a data storage device to perform a data operation that is a distance of one level from the host computer initiating the system call. Note that in some embodiments, a different mechanism, called an "in-line call" may be used to perform functionality similar to that of system calls. For purposes of the discussion herein, the functionality added to system calls may be similarly applied to in-line calls.

Additionally, one of the host computers, such as the computer 20, may instruct data storage device 12 to perform a data operation indirectly through data storage device 18 by using a remote system call. With a remote system call, the host computer may issue a request to the data storage device 18 which, in turn, subsequently issues a remote system call using the connection 12a to the data storage device 12 to perform a particular data operation, such to read or write data. A remote system call is a call directed to a data storage device to perform a data operation that is a distance of two levels from the host computer initiating the system call.

In yet another example of performing a data operation, one of the host computers, such as the computer 20, may desire to issue a command to either the device 14 or the device 16. The host computer 20 may indirectly issue a command to a data storage device, such as the device 14, using the data storage devices 12 and 18 as a "pass through" or indirect connection to the data storage device 14 or the device 16. This may be done by the host computer 20 issuing a multihop system call. Generally, a multihop system call may be described as a call directed to a data storage device to perform a data operation that is a distance of three or more levels from the host computer initiating the call. Multihop system calls are described in more detail elsewhere herein.

It should be noted that in the illustrated embodiment, the connections between any two data storage devices, such as the device 12 and the device 18 connected via the connection 12a, may be identified by one or more connection identifiers rather than a machine identifier. In other words, when a host computer 20 issues a command directed for the target device 12, the connection between each of the devices 12, 18 may be identified by a connection identifier rather than identifying a target data storage device, such as the device 12, in the call. This is described in more detail elsewhere herein. Additionally, it may be generalized in the illustrated embodiment where each of the data storage devices 12, 14, 16, and 18 have interconnections defined between them. A connection between any two data storage devices, such as the connection 12a, or a connection from a computer to a data storage device, such as the connection 20a, may be identified through a connection identifier rather than using machine identifiers associated with a data storage device or computer. In other words, when a host computer, such as 20, directs a data storage device, such as the device 14, to perform a data operation, the host computer 20 may use one or more connection identifiers to specify a path from the host computer 20 to the target data device 14. The host computer 20 may identify a first connection identifier from host computer 20 to data storage device 18, a second connection identifier between data storage devices 18 and 12, and a third connection identifier between data storage devices 12 and 14. These connection identifiers may be specified, for example, in a multihop system call. Alternatively, a multihop system call may specify the systems used for the multihop path or, in some embodiments, use only an identifier for the end system or the end connection. However, specifying all of the intermediate connections or systems allows each system handling the call to have only local knowledge (i.e., to not have to be aware of the entire system and the topology thereof).

Figure 2:
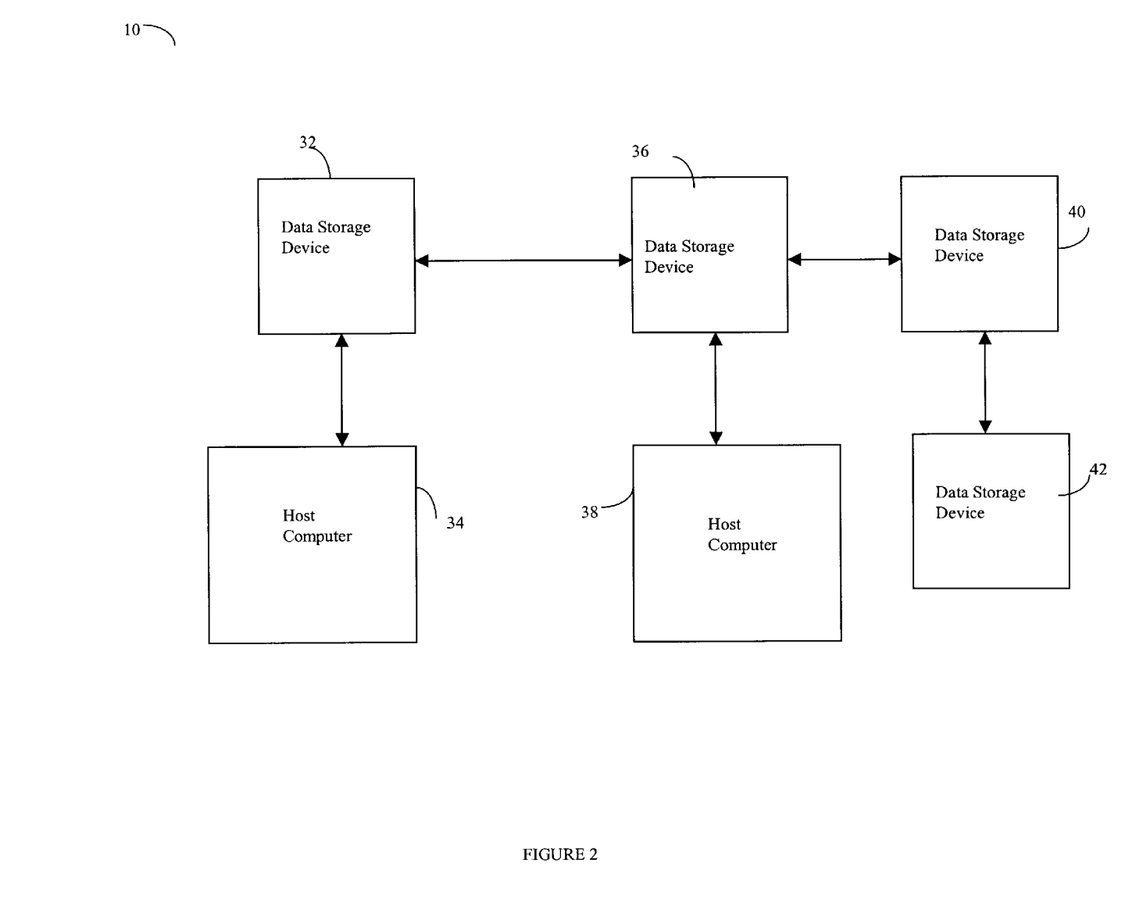
FIG. 2 is an example of another embodiment of computer system according to the present invention.

Referring now to FIG. 2, shown is an example of another embodiment of a computer system that uses the multihop technique disclosed herein. The computer system 10 includes two host computers 34, 38 and multiple storage devices 32, 36, 40, and 42 that are interconnected. Additionally, there is a direct connection between the host 34 and the data storage device 32 as well a direct connection between the host 38 and the data storage device 36. It should be noted that each of the data storage devices 32, 36, 40, and 42 are similar to the data storage devices described in conjunction with FIG. 1 and elsewhere herein. Similarly, each of the host 34 and 38 are similar to hosts 20, 22, and 24 also described in connection with FIG. 1 and described elsewhere herein. FIG. 2 shows an alternate embodiment and arrangement of data storage devices and host computers, for example, as may be included in an arrangement in which the host 38 and device 36 mirror the host 34 and the data included on the data storage device 32. In other words, the data storage device 36 may serve as a shadow of the device 32. In this particular arrangement, the host 38 may serve as an alternate system, for example, when host 34 experiences operating problems and is removed from the network. For example, if the host 34 and/or the device 32 experience a power failure or other type of system failure, the host 38 and the data stored on the device 36 may automatically come on line to replace and function as an alternate for the host 34 and the device 32. In order to allow the host 38 and device 36 to function as just described, the host 34 may include software that, for example, performs remote backup and copy operations to the devices 36 and 40 from the device 32. In other words, the host 34 may issue commands to the data storage device 32 to copy data to devices 36 and 40. In this arrangement, the device 32 may serve as a backup device for 36. This may allow the system 38 and device 36 to operate in the computer system 10 replacing the system 34 and device 32, such as when there is a power failure or other system problems of device 32 and/or host 34. In an instance in which the host 38 and device 36 function to replace the host 34 and device 32, the host 38 and device 36 need to have a designated backup storage device, which in the illustrated embodiment is device 40. Thus, the system 34 issues instructions to store data on data storage device 40 as well as data storage device 36.

It should be noted that, in a manner similar to that described in conjunction with FIG. 1, the connections between each of the data storage devices 32, 36, and 40 are identified by a connection identifier rather than a machine identifier. This is also explained in more detail in paragraphs that follow.

Figure 3:
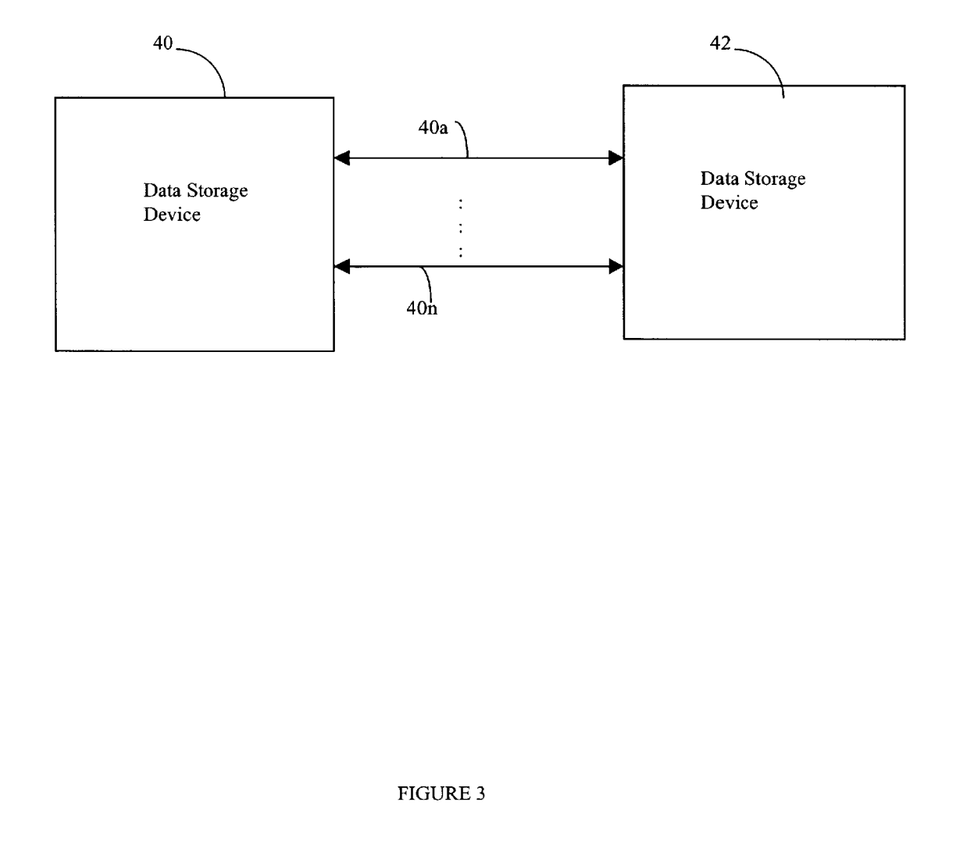
FIG. 3 illustrates an embodiment of the invention having connections between two data storage devices that may be included in the computer systems of FIGS. 1 and 2.

Referring now to FIG. 3, shown is an embodiment having different connections that may exist between any two storage devices interconnected in each of the foregoing arrangements. For example, the data storage devices 40 and 42 included in the computer system 10 of FIG. 2 are shown in more detail here as having any one of a variety of communication connections 40a–40n. Each of the connections 40a–40n may be uniquely identified by a connection identifier to specify a path, for example, for issuing a system call, a remote system call, or a multihop system call to a data storage device 42 directly or indirectly using, for example, the data storage device 40.

It should be noted that there may exist one or more connections between a host computer and a data storage device, or between any two storage devices. The number and type of each may vary in accordance with each implementation and uses. Also, a connection identifier specifying a particular connection between a first port of a first storage device and another port of a second storage device may be a number or other unique identifier enabling a message to be forwarded from one data storage device to another. In some embodiments, the connection identifier may be a number between one and sixteen, although other ranges of numbers are possible.

In the foregoing computer system arrangements of data storage devices and host computer systems, software may be executed on each of the host systems connected to the storage devices to perform the particular data operations, such as those related to performing backup operations and the like. Software also may execute on each of the data storage devices in connection with performing different data operations to receive the different data operation commands from the different host systems. Such software is available, for example, from EMC Corporation of Hopkinton, Mass.

Figure 4:
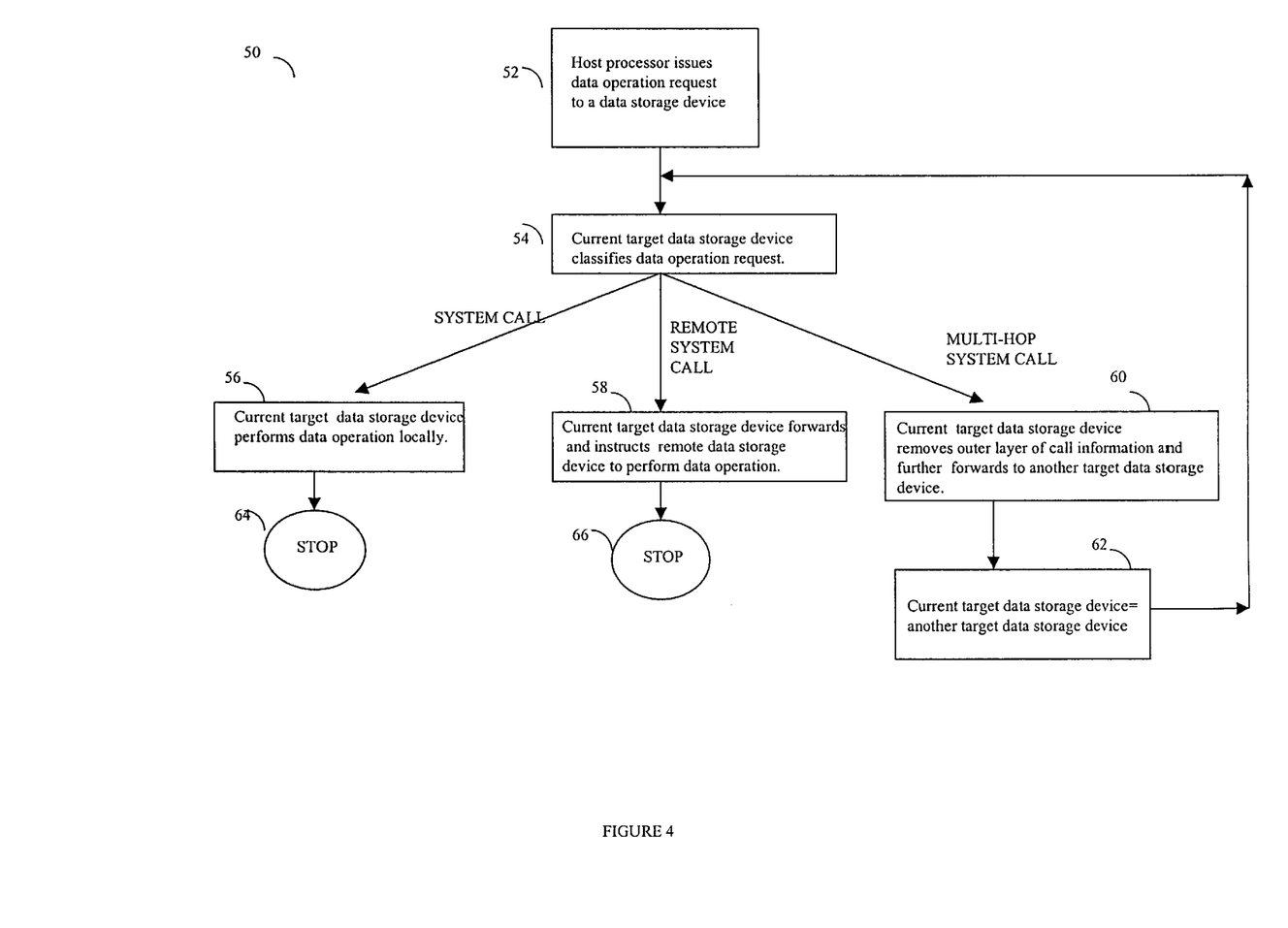
FIG. 4 is a flowchart of a method performed in a computer system according to the present invention for performing a data storage operation.

Referring now to FIG. 4, shown is a flowchart illustrating one embodiment for performing data operations, for example, in the computer system arrangements of FIG. 1 and FIG. 2. At a step 52, a host processor issues a data operation request to a data storage device. At a step 54, the current target data storage device that receives the request classifies the data operation request. In the illustrated embodiment, the data operation request may generally be classified as one of three categories: a system call, a remote system call, or a multihop system call. (Note that conventional I/O operating are not discussed here but, for purposes of this discussion, may be considered different from the data operation requests discussed in connection with FIG. 4). If the target data storage device classifies the data operation request as a system call, the current target data storage device performs the data operation locally. If the data operation request is classified as a remote system call with respect to the current target data storage device, the current target data storage device further forwards and instructs the remote data storage device to perform the data operation. In other words, the current target data storage device may be viewed as an intermediate storage device which further forwards and issues a data operation to yet another data storage device that performs the data operation. If the data operation request is classified as a multihop system call, the current target data storage device removes the outer layer of call information (i.e., the information that caused the command to reach the current target) and further forwards the call information or data to a second target data storage device. Control proceeds to a step 62 where the second target data storage device now becomes the current target data storage device with respect to subsequent processing steps. Control then proceeds to the step 54 where the newly designated current target data storage device classifies the data operation request. Generally, the multihop system call may employ the foregoing technique of embedding a remote system call that is applied to a data storage device that is three or more layers removed from the requesting host computer, i.e. more than a remote system call. As part of the interpretation process, the current target data storage device may remove an outer layer of data associated with a current call instance, and further forward the remaining data to a second target data storage device. This second target data storage device then performs the same process of removing an outer layer of data. The process of removing a layer of call information and further forwarding remaining data to another target data storage device may be performed until a remote system call or a system call is reached at the inner most layer of data.

The steps of the flowchart 50 are a method of classifying a data operation request and the method steps may be performed by each of the data storage devices included in an arrangement. Each incoming data operation request may be classified in accordance with the level of the system call with respect to the level of data device which is the receiving target data storage device from an initiating host computer. If the level is one implying that the receiving data storage device is the actual target data storage device to perform the designated data operation, a system call may be issued from the host system to the target device. With the level of two, a remote system call may be used to further forward the data operation instruction to a second level of data storage device from the first data storage device. If the level is greater than two, a multihop system call may be used in that the target data storage device to perform the data operation is three or more nodes removed from the issuing host processor.

Referring back to the computer system 10 of FIG. 2, for example, the host computer 34 may initiate a data operation request. Assume that the computer system diagram may be viewed as a graph of nodes in which each node is a computer system or a data storage device having edges that are the connections. A depth or level of one associated with the data operation request indicates a first data storage device 32 where a system call may be used to issue a data operation to be performed. With a depth of two, for example, if the host processor 34 issues a data operation request to be performed by a second storage data device 36, a remote system call may be used. With a depth of three, the host processor 34 may use a multihop system call, for example, to issue a data operation request to be performed by the third data storage device 40.

In one example, the data storage device 32 may execute the method steps included in the flowchart 50 in accordance with classifying the data operation request as a system call, a remote system call or a multihop remote system call, for example, as may be designated by an operation code in a particular field in which the data operation request. If the data storage device 32 classifies an incoming data operation request as a remote system call, the data storage device 32 may issue a remote system call to the data storage device 36 to perform the actual data operation. In the event that a multihop system call is detected, for example, by an operation code that may be included in the system call, the data storage device 32 may remove the outer layer of call information, such as a first level of connection identifier information which may indicate the second data storage device 36 as the device to which the remote system call is directed, and further forward remaining data to the storage device 36. In turn, the data storage device 36 now becomes the receiving or the current target data storage device and it proceeds to perform the processing steps 54, 56, 58, 60 and 62. Generally, any incoming system call that is classified as a multihop call by a data storage device performs the step of removing the outer layer of call information (step 60) and further forwarding the data that may be further encapsulated or embedded in the call to another target data storage device, for example, as may be specified by a current connection identifier (step 62). That target data storage device then proceeds to perform the classification of the embedded data. This process may be performed by each of the different target data storage devices in accordance with the connection identifier that may be included in a data operation request until either a system call or a remote system call has been classified by the current target data storage device. In some embodiments, the maximum number of hops is set to seven or eight in order to limit the maximum size of a multihop command.

Figure 5:
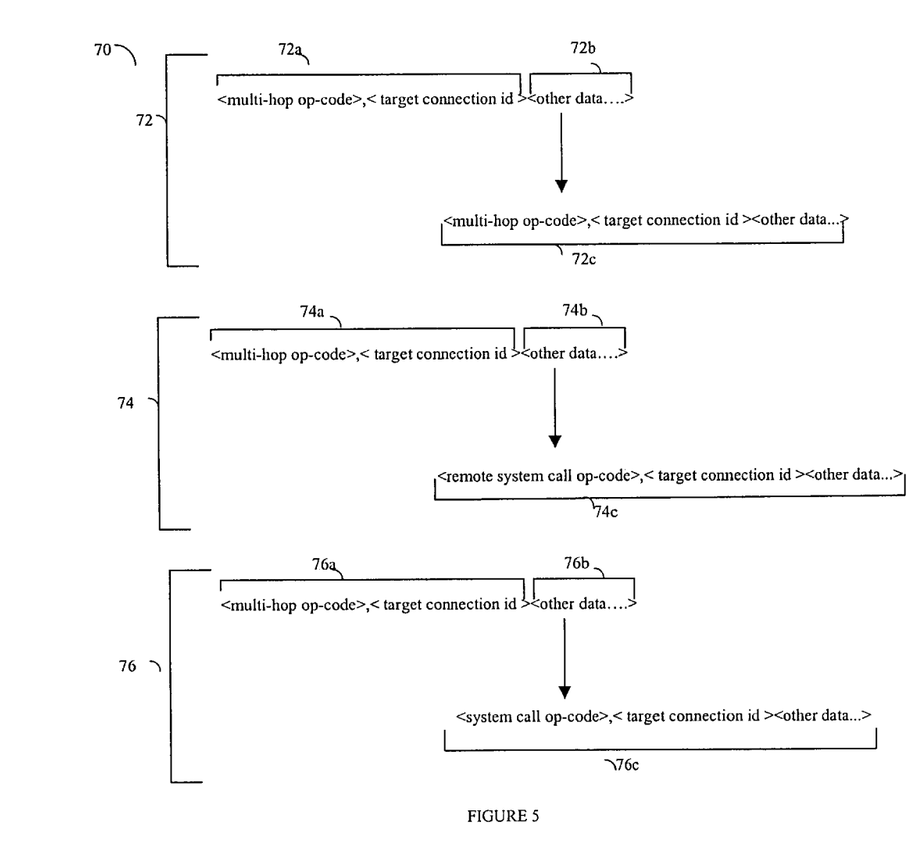
FIG. 5 is an example of how data included in a multihop system call may be interpreted by a target data storage device according to the present invention.

Referring now to FIG. 5, shown is an example of an embodiment of different interpretations of data that may be embedded in a multihop system call. An element 72 includes a message format having portions 72a and 72b. Taken together, the portions 72a and 72b may represent a format of a multihop system call. The portion 72a includes a multihop op-code and a target connection id which may be removed as in the processing step 60 by the current target data storage device. The target connection id included in the field 72a identifies a connection to yet another data storage device to which the other data portion 72b may be forwarded. The description 72c is a representation of how the receiving data storage device may interpret the data 72b while performing processing of step 54. Generally, a first data storage device may remove the portion 72a as part of the step 60, and then further forward the portion 72b to a second data storage device designated by the target connection id included in the field 72a. The other data 72b, when actually interpreted, for example, by the second data storage device, may be yet another multihop remote system call as indicated by field 72c. In other words, the other data 72b may be interpreted as the data which is actually included in the representation 72c.

Referring to element 74, shown is an example of another possible mapping of information included in a data operation request by a receiving target data storage device. In the processing of the step 60, a first data storage device may remove the portion 74a and further forward the portion 74b to a second target data storage device as specified by the target connection id included in the portion 74a. As an example, the data portion 74b may be interpreted by the second data storage device as represented in field 74c. In other words, the first data storage device forwards data to a second data storage device which further interprets the data it receives as a remote system call as represented in field 74c. Yet the third data element 76, includes a portion 76a and 76b similar to what is shown in elements 72 and 74. In the processing of step 60, a first data storage device may remove the portion 76a from the data received and further forward that data portion 76b to a second data storage device as designated by the target connection id included in field 76a. The second data storage device may then execute the processing of step 54, 56, 58, 60 and 62 and interpret the field 76b data as represented in a field 76c. In the illustrated example, the data which is passed to the second data storage device may be interpreted as a system call including operations, for example, which are performed in accordance with step 56.

While the invention has been disclosed in connection with various embodiments, modifications thereon will be readily apparent to those skilled in the art. Accordingly, the spirit and scope of the invention is set forth in the following claims.

What is claimed is:

1. A method executed on a first data storage device for processing a data operation request comprising:

determining whether a data operation request is one of a remote system call for a data operation to be performed by a target data storage device directly connected to said first data storage device, and a multihop system call;

in response to determining that said data operation is a multihop system call, removing a first portion of data associated with said data operation request, wherein said first portion is not removed if said data operation request is a remote system call; and in response to determining that said data operation is a multihop system call, forwarding a second portion of said data associated with said data operation request to a second data storage device, wherein said second data storage device interprets said second portion and further determines if said second portion is a data operation request for a multihop system call.

2. The method of claim 1, further including:

determining whether said data operation request is a system call.

3. The method of claim 2, wherein said system call directs said first data storage device to respond to said data operation request.

4. The method of claim 3, wherein said second data storage device is directly connected to said first data storage device, and said remote system call directs said second data storage device to respond to said data operation-request.

5. The method of claim 1, wherein said second data storage device is directly connected to said first data storage device and, a third data storage device is connected to said second data storage device, and said data operation request is a multihop system call directing said third data storage device to respond to said data operation request.

6. The method of claim 5, wherein said third data storage device is directly connected to said second data storage device.

7. The method of claim 1, wherein said second data storage device is directly connected to said first data storage device and a third data storage device is indirectly connected to said second data storage device by at least one intermediate data storage device, said at least one intermediate data storage device providing a connection between said second and said third data storage devices, said third data storage device being said target data storage device.

8. The method of claim 1, wherein said first portion includes a connection identifier identifying a communication connection between said first and said second data storage devices.

9. A computer system comprising:

a host initiating a data operation request; and at least three data storage devices, wherein each of said at least three data storage devices includes machine executable code for:

receiving and interpreting said data operation request;

determining if said data operation request is one of a remote system call for a data operation to be performed by a target data storage device directly connected to said each data storage device, and a multihop system call;

removing a first portion of data associated with said data operation request if said data operation request is a multihop system call, wherein said first portion is not removed if said data operation request is a remote system call; and forwarding, in response to determining that said data operation is a multihop system call, a second portion of said data associated with said data operation request to another data storage device.

10. The computer system of claim 9, wherein each of said at least three data storage devices further includes:

machine executable code for determining whether said data operation request is system call.

11. The computer system of claim 10, wherein if said data operation request is a system call, said data operation directs said each data storage device of said at least three data storage devices to respond to said data operation request.

12. The computer system of claim 11, wherein said each data storage device is a first data storage device and a second data storage device of said at least three data storage devices is directly connected to said first data storage device and, if said data operation request is a remote system call, said data operation request directs said second data storage device to respond to said data operation request.

13. The computer system of claim 9, wherein said other data storage device is a second data storage device that is directly connected to said first data storage device, and a third data storage device is connected to said second data storage device, and if the first data storage device determines that said data operation request is a multihop system call, the data operation directs said third data storage device to respond to said data operation request.

14. The computer system of claim 13, wherein said third data storage device is directly connected to said second data storage device.

15. The computer system of claim 9, wherein a second data storage device is directly connected to said each data storage device and a third data storage device is indirectly connected to said second data storage device by at least one intermediate data storage device, said at least one intermediate data storage device providing a connection between said second and said third data storage devices, said third data storage system being said target data storage device.

16. The computer system of claim 9, wherein said first portion includes a connection identifier identifying a communication connection between said first and said second data storage devices.

17. A computer system comprising:

at least one host system;

a plurality of interconnected data storage devices connected to the at least one host system, each of said plurality of data storage devices including machine executable code for:

classifying a data operation as one of a system call for said data operation to be performed by said each data storage device, a remote system call for said data operation to be performed by a data storage device directly connected to said each data storage device, and a multihop system call; and if a data operation is classified as a multihop system call by a first of said plurality of data storage devices, removing a portion of the data associated with the multihop system call, wherein said first portion is not removed if said data operation request is a remote system call, and forwarding a second portion of the data to a second of said data storage devices as specified by a connection identifier included in the first portion, wherein said machine executable code for removing a first portion and forwarding a second portion included in each of said data storage devices forms a recursive process until one of said plurality of data storage device receives a second portion that is interpreted as one of a system call and a remote system call.

18. The computer system of claim 17, wherein there is at least one direct connection between one of the plurality of data storage devices and at least one of the host systems.

19. The computer system of claim 17, wherein there is at least one indirect connection between one of the plurality of data storage devices and at least one of the host systems.

20. A data storage device, comprising:

means for determining whether a data operation request is one of a remote system call for a data operation to be performed by a target data storage device directly connected to said data storage device, and a multihop system call;

means for removing a first portion of data associated with said data operation request in response to determining that said data operation is a multihop system call, wherein said first portion is not removed if said data operation is a remote system call; and means for forwarding a second portion of said data associated with said data operation request to an other data storage device in response to determining that said data operation is a multihop system call, wherein said other data storage device interprets said second portion and further determines if said second portion is a data operation request for a multihop system call.

21. The data storage device of claim 20, further comprising:

means for determining whether said data operation request is a system call for said data operation request is to be performed by said data storage device.

22. The data storage device of claim 21, wherein said system call directs the data storage device to respond to said data operation request.

23. The data storage device of claim 20, wherein said first portion includes a connection identifier identifying a communication connection between said first and said second data storage devices.

24. A computer program product for processing a data operation request on a first data storage device comprising:

executable code that determines whether a data operation request is one of a remote system call for a data operation to be performed by a target data storage device directly connected to said first data storage device, and a multihop system call;

executable code that, in response to determining that said data operation is a multihop system call, removes a first portion of data associated with said data operation request, wherein said first portion is not removed if said data operation request is a remote system call; and executable code that, in response to determining that said data operation is a multihop system call, forwards a second portion of said data associated with said data operation request to a second data storage device, wherein said second data storage device interprets said second portion and further determines if said second portion is a data operation request for a multihop system call.

25. A method executed on a first data storage device for processing a data operation request comprising:

determining whether a call received at said first data storage device for a data operation request is a multihop system call, wherein said call includes a data structure comprising at least one parameter that is a tag parameter identifying an issuer of said call;

in response to determining that said data operation is a multihop system call, removing a first portion of data associated with said data operation request; and in response to determining that said data operation is a multihop system call, forwarding a second portion of said data associated with said data operation request to a second data storage device, wherein said second data storage device interprets said second portion and further determines if said second portion is a data operation request for a multihop system call.

26. The method of claim 25, wherein said data structure includes at least one of: a flag including an indicator of said data operation request, and a control parameter indicating whether a response is to be returned.

27. The method of claim 26, wherein said flag indicates at least one of: a type of error checking to be performed, and a data format type.

28. The method of claim 26, wherein said flag includes a control parameter indicating that a response to said call is to be returned, and the method further comprising:

returning information in response to said call, wherein said information returned comprises a data structure including at least one of: a return error code, data payload returned from a target in response to said call, and an inline tag specifying a sender of said call.

29. A computer program product that processes a data operation request comprising:

executable code that determines whether a call received at a first data storage device for a data operation request is a multihop system call, wherein said call includes a data structure comprising at least one parameter that is a tag parameter identifying an issuer of said call;

executable code that, in response to determining that said data operation is a multihop system call, removes a first portion of data associated with said data operation request; and executable code that, in response to determining that said data operation is a multihop system call, forwards a second portion of said data associated with said data operation request to a second data storage device, wherein said second data storage device interprets said second portion and further determines if said second portion is a data operation request for a multihop system call.

30. The computer program product of claim 29, wherein said data structure includes at least one of: a flag including an indicator of said data operation request, and a control parameter indicating whether a response is to be returned.

31. The computer program product of claim 30, wherein said flag indicates at least one of: a type of error checking to be performed, and a data format type.

32. The computer program product of claim 30, wherein said flag includes a control parameter indicating that a response to said call is to be returned, and the computer program product further comprising:

executable code that returns information in response to said call, wherein said information returned comprises a data structure including at least one of: a return error code, data payload returned from a target in response to said call, and an inline tag specifying a sender of said call.

* * * * *